United States Patent
Bergami

(10) Patent No.: US 6,638,330 B1
(45) Date of Patent: Oct. 28, 2003

(54) DEVICE FOR FILTERING THE INTAKE AIR OF INTERNAL COMBUSTION ENGINES

(75) Inventor: Gaetano Bergami, Bologna (IT)

(73) Assignee: BMC S.R.L., Bologna (IT)

( * ) Notice: Subject to any disclaimer, the term of this patent is extended or adjusted under 35 U.S.C. 154(b) by 0 days.

(21) Appl. No.: 10/149,574
(22) PCT Filed: Aug. 3, 2000
(86) PCT No.: PCT/IB00/01091
§ 371 (c)(1),
(2), (4) Date: Dec. 15, 1999
(87) PCT Pub. No.: WO01/43252
PCT Pub. Date: Jun. 21, 2001

(30) Foreign Application Priority Data

Dec. 15, 1999 (IT) .......................... BO99A0685

(51) Int. Cl.⁷ .......................... B01D 27/08; B01D 29/23
(52) U.S. Cl. .......................... 55/315.1; 55/331; 55/418; 55/418.1; 55/385.3; 55/476; 55/505; 55/510
(58) Field of Search ............... 55/315.1, 331, 55/385.3, 418, 418.1, 495, 498, 476, 505, 510

(56) References Cited

U.S. PATENT DOCUMENTS 5,888,260 A * 3/1999 Sica ........................ 55/331
6,093,237 A * 7/2000 Keller et al. ............... 95/287

FOREIGN PATENT DOCUMENTS

| DE | 255673 | 4/1988 |
| FR | 1563990 | 4/1969 |
| GB | 467194 A | 6/1937 |

OTHER PUBLICATIONS

Fujita Yukio; Gas Filter, Apr. 5, 1978, Patent Abstracts of Japan (Abstract).

* cited by examiner

Primary Examiner—Robert A. Hopkins
(74) Attorney, Agent, or Firm—William J. Sapone; Coleman Sudol Sapone, P.C.

(57) ABSTRACT

In a device for filtering the intake air of internal combustion engines, including a tubular housing (2) with one filtering cartridge (3) fixed at an end by means of support means (4) provided with an inlet opening (5) and fit to support the housing (2) in correspondence of a lower opening (9) thereof, the filtering cartridge (3) is fixed to the support means (4), near the edges of the opening (5) so forming a single body, and is internally provide with air deflectors (6) fixed at the free end of the filtering cartridge (3) in such a way that the air flow coming from the opening (5) is forced by the air deflectors (6) to pass through the filtering cartridge (3) and comes out from the device (1) through an outflow opening (7), passing through the space between the filtering cartridge (3) and the external housing (2).

14 Claims, 2 Drawing Sheets

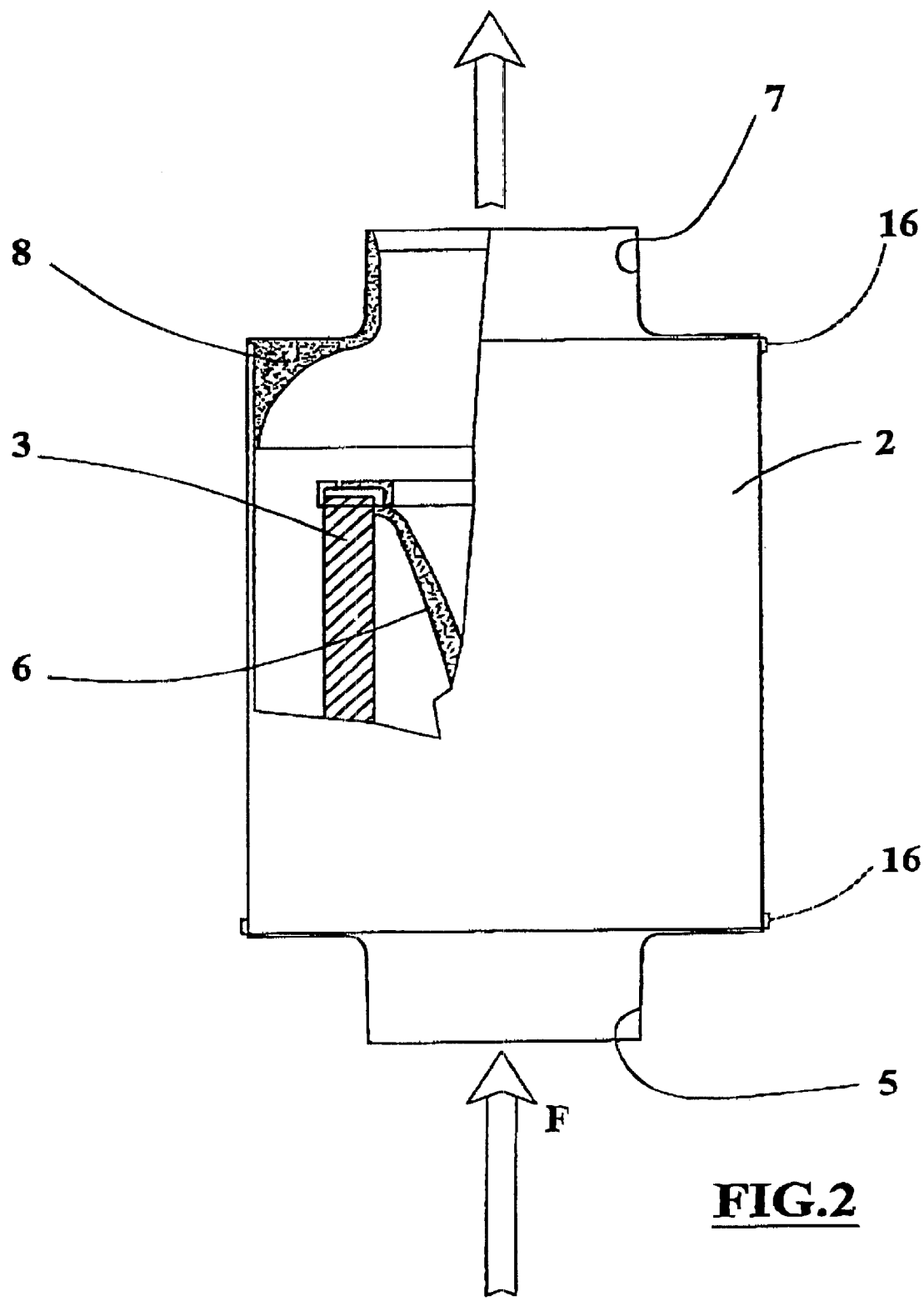

DEVICE FOR FILTERING THE INTAKE AIR OF INTERNAL COMBUSTION ENGINES

TECHNICAL FIELD

The present invention refers to devices for filtering of the air used in the air-fuel mixture supplied to the internal combustion engine.

Particularly the invention refers to a device for filtering the intake air of supercharged and aspirated internal combustion engines.

BACKGROUND ART

As known in the automotive field the air filtering has particular importance since causes the gasoline and air mixing and therefore the so obtained fuel mixture used in the combustion.

The intake air therefore must be filtered for removing any impurities that may clog or wear and damage the inner members of the motor.

The air filters are normally flattened, cylindrical or conical shaped and are contained in a related housing which is in flow communication with the air intakes through an aperture and allows the filtered air outflow through a further opening.

Document GB 467,194 discloses a filtering device including a tubular housing for a filter fixed to a support mean provided with an inlet opening and supporting the tubular housing. In said device the air flow pass through the filter in a non homogeneous manner. Document U.S. Pat. No. 5,888,260 discloses a filtering device provided with a conical filter having an inner air deflector spherically shaped and providing a low efficiency flow deflection. The conical filter is housed in a single body tubular housing without allowing the disassembly of the filter from the outlet.

The known filters for the use in sporting engines, the so-called "sprint filter", have polyester filtering cartridges, whose ends have heavy polyurethan flanges and/or caps that are extremely expensive and further cannot withstand temperatures greater than 90° C., because of the used material. These filters have generally truncated cone shaped and they are contained in metallic containers shaped as almost conic or truncated-conic segments: the drawback of such containers consist in lacking of the air thermally insulation since such containers transmit an excessive heat to the air.

The known filters with the paper filtering cartridges ensure a good filtration, because they hold particles greater than 10 microns, but they have the drawback of an excessive flow resistance for the air flow.

The filters with polyurethan filtering cartridges have a low filtering with a consequent acceptable flow resistance, but they have the drawback connected with the so-called "sponge effect" in presence of high humidity, conditions happening in the areas with continental climate, creating consequently technical problems for the sporting engines, using these kind of filters.

Another drawback of the known sprint filters consists both in the reduced inner volume of the external filter housing, mostly due to the conic shape of this latter, and in the insufficient filtering surface, due to the conic shape of the filter with wide inclination angles.

Another drawback of the known filters consists in the speed increase of the air passing through the conic container with variable geometry and therefore in a reduction of the filtering capacity.

DISCLOSURE OF THE INVENTION

The main object of the present invention is to propose a filtering device for the intake air of internal combustion engines fit to operate at temperatures up to about 250° C. and at the same time to thermally isolate the air flow passing through it and filtered.

Further object is to propose a device without "sponge effect" in high environmental humidity conditions and however characterized by low flow resistances, by an high air filtering value and by a low production cost.

Further object consists in providing a device reliable having a life greater than a distance of about 300,000 km, however usable with a very low maintenance and easy to dispose because primarily made of a natural material.

Another object is also to propose a device having small external dimensions still preserving the most wide internal volume.

BRIEF DESCRIPTION OF THE DRAWINGS

The characteristics of the invention are underlined in the following with particular reference to attached drawings, in which:

FIG. 2 shows a partially sectioned view of the external housing of the device of FIG. 1.

BEST MODE OF CARRYING OUT THE INVENTION

Figure 1:
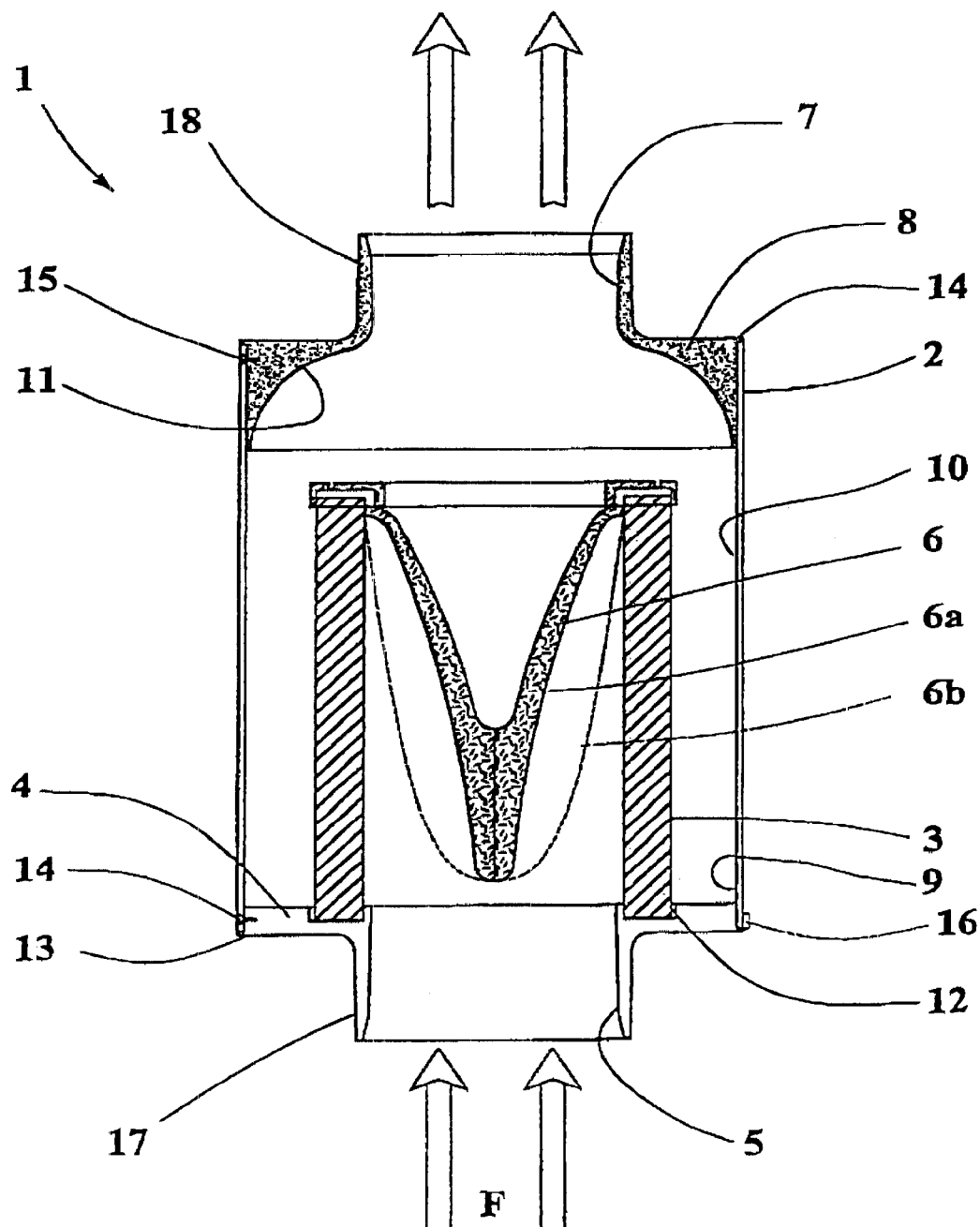
FIG. 1 shows a longitudinal section view of the device object of the present invention.

With reference to the FIGS. 1 and 2, numeral 1 is a filtering device for the intake air of internal combustion engines including essentially a tubular housing 2, a filtering cartridge 3, support means 4 and duct means 8.

The tubular housing 2 is cylindrical and is provided with a lower opening 9 and an upper opening 10. The housing is preferably made of carbon fiber so that it is a thermal insulator between the. external environment and the air flow passing through.

The tubular housing 2 is clamped to the support means 4 by means of fastener 14, such as a screw or by means of an elastic hose clamp 16.

The support means 4 are essentially made of a disk centrally provided with an inlet opening 5, normally connected to the vehicle air intakes. On the internal edge of the opening 5 an inner groove 12 is carried out, in which an end of the filtering cartridge or filter 3 is inserted. In the preferred embodiment the filter 3 and the support means 4 are fixed so as to form a single body, for instance by means of adhesives or plastic material melting.

The support means 4 are peripherally provided with a seat 13 for housing the inner wall of the tubular housing 2 in correspondence of the lower opening 9. The support means are made of nylon strengthened with glass fiber.

The duct means 8 are fixed to an upper opening 10 of the tubular housing 2 and are centrally provided with an outflow opening 7. These means 8 internally have a curved fillet surface 11 between the tubular housing inner surface and the outflow opening 7. The duct means 8 are peripherally provided with a recess 14 for housing the tubular housing inner wall in correspondence of its upper opening 10. The duct means 8 are removably fixed to the tubular housing 2 by means of fastener 15, such as screw and/or elastic hose clamp 16.

The filtering cartridge 3 has a cylindrical shape and is made of cotton saturated with low viscosity oil. The filtering cartridge 3 is internally provided with air deflectors 6, fixed to the free end of the filtering cartridge 3, so that the air flow, shown by the arrows F of FIG. 1, incoming by the opening 5 is forcedly diverted by the air deflectors 6 toward the filtering cartridge 3. The diverted air flow pass through the filtering cartridge 3, crosses the cavity formed by this latter and the external housing 2 and comes out from the outflow opening 7, entering into the air ducts towards the engine.

The air deflectors 6 are substantially shaped as a cone whose vertex is turned toward the inlet opening 5 and whose base is a single body with the free edge of the filtering cartridge 2.

The substantially conical shape of the air deflectors 6 may have a section delimited by two semi-parabolas with parallel axis and the respective branches joined in correspondence of the air deflectors vertex so as to realize a section profile, concave 6a or convex 6b, respectively achieved by joining the semi-parabolas with opposed axis in comparison to the branches or vice-versa.

The operation of the device 1 is simple because the mouthpiece 17 of the inlet opening 5 of the support means 4 is joined to, or it operates directly as, air intakes of the vehicle in which the device is mounted on and, similarly, the mouthpiece 18 of the duct means 8 is connected to the air intake ducts into the engine.

The realization of the tubular element 2 in carbon allows that the tubular filtering cartridge 2 withstands temperatures up to about 250° C. for 24 hours continues cycles, allowing the air contained therein to enter into the motor with low temperatures.

The device 1 uses a constant section in entrance and increases the air speed downstream the filtering cartridge 3, so increasing the air speed inside t he intake ducts, without creating however problems for the device.

An evident advantage consists in the carbon fiber tubular housing 2 allowing to realize, compared with the metallic housings, a greater heat insulation between the air passing through it and the external environment. It is possible to lower the air temperature of about 20 degrees, in comparison with a traditional device assembled in the motor compartment.

It is useful underlining that the cylindrical shape of the tubular housing 2 allows the device 1 to have a wide volume, greater of about 12% in comparison with an equivalent conical air filtering device, even with small dimensions. Furthermore the consequent small dimensions with the same internal volume, allows an easy application to every kind of vehicles.

A variation of the device 1 provides that the tubular element 2 is fixed to the support means 4 and/or to the duct means 8 by means of at least an elastic hose clamp 16.

The particular device geometry and the particular shapes of the different elements, allow to realize a car and sporting engine filter that is efficient for not less than 300,000 km covered by the vehicle.

The main advantage of the present invention is to provide a filtering device for the intake air of internal combustion engines fit to operate at temperatures up to about 250° C. and at the same time to thermally isolate the air flow passing through it and filtered.

Further advantage is to provide a device without the "sponge effect" in high environmental humidity conditions and. however, characterized by low flow resistance, by an high air filtering value and by a low production cost.

Further advantage consists in providing a device reliable and with a life not less than about 300,000 km covered, however usable with a very low maintenance and easy to dispose because primarily made with a natural material.

Another advantage is also to provide a device having small external dimensions still preserving the most wide internal volume.

What is claimed is:

1. Device for filtering the intake air of internal combustion engines, including a tubular housing (2) for at least a filtering cartridge (3) fixed at an end by means of support means (4) provided with an inlet opening (5) and fit to support said housing (2) in correspondence of a lower opening (9) thereof, said device (1) being characterized in that said filtering cartridge (3) is fixed to said support means (4), near the edges of said opening (5) so forming therewith a single body, and it is internally provided with air deflectors (6) fixed at the free end of said filtering cartridge (3); said device (1) comprising duct means (8) centrally provided with an outflow opening (7) and removably fixed to an upper opening (10) of said tubular housing (2) by means of fastener (15); the tubular housing (2) being made of carbon fiber and being a heat insulator between the external environment and the air flow passing through; the air flow coming from said opening (5) is forced by said air deflectors (6) to pass through said filtering cartridge (3) and comes out from said device (1) through the outflow opening (7), passing through the space between said filtering cartridge (3) and the external housing (2).

2. Device according to claim 1 characterized in that said duct means (8) provide internally a curved fillet surface (11) between said tubular housing (2) and said outflow opening (7).

3. Device according to claim 1 characterized in that said duct means (8) are peripherally provided with a housing recess (14) of the inside wall of said tubular housing (2) in correspondence of said upper opening (10).

4. Device according to claim 1 characterized in that said air deflectors (6) are shaped substantially as a cone whose vertex is turned toward the inlet opening (5) and whose base is fixed to the free edge of said filtering cartridge (2).

5. Device according to claim 4 characterized in that said substantially conic shape of said air deflectors (6) has an axial section shaped like two semi-parabolas with parallel axis and branches joined in correspondence of the air deflectors (6) vertex forming a concave (6a) or convex (6b) profile.

6. Device according to claim 1 characterized in that said tubular housing (2) is cylindrical.

7. Device according to claim 1 characterized in that said filtering cartridge (2) is made of cotton saturated with low viscosity oil.

8. Device according to claim 1 characterized in that said support means (4) have an inner groove (12) in which an end of the filtering cartridge (3) is inserted.

9. Device according to claim 1 characterized in that said support means (4) are peripherally provided with a seat (13) for housing the inside wall of said tubular housing (2) in correspondence of its lower opening (9).

10. Device according to claim 1 characterized in that said tubular housing (2) is removably clamped to said support means (4) by means of fastener means (14).

11. Device according to claim 1 characterized in that said support means (4) are made of nylon strengthened with glass fiber.

12. Device according to claim 1 characterized in that said filtering cartridge (2) is cylindrical.

13. Device according to claim 1 characterized in that said tubular element (2) withstands temperatures up to 250° C.

14. Device according to claim 1 characterized in that said tubular element (2) is removably fixed to said support means (4) and to said duct means (8) by means of at least an elastic hose clamp (16).

* * * * *